United States Patent [19]

Wheelock et al.

[11] 4,446,011

[45] May 1, 1984

[54] PROCESS FOR REGENERATING PEROVSKITE CATALYSTS AND HYDROCARBON TREATING PROCESSES UTILIZING THE REGENERATED CATALYST

[75] Inventors: Kenneth S. Wheelock; Robert C. Schucker, both of Baton Rouge, La.

[73] Assignee: Exxon Research and Engineering Co., Florham Park, N.J.

[21] Appl. No.: 411,366

[22] Filed: Aug. 25, 1982

[51] Int. Cl.³ .................... C10G 47/12; B01J 23/92
[52] U.S. Cl. ................................ 208/121; 208/112; 502/38
[58] Field of Search ............................ 208/121, 112; 252/411 R, 411 S, 416

[56] References Cited

U.S. PATENT DOCUMENTS

| 3,909,392 | 9/1975 | Horecky, Jr. et al. | 208/120 |
| 4,055,513 | 10/1977 | Wheelock | 252/462 |
| 4,102,777 | 7/1978 | Wheelock | 208/121 |
| 4,179,409 | 12/1979 | Gladrow et al. | 252/455 Z |
| 4,208,269 | 6/1980 | Gladrow et al. | 208/120 |
| 4,244,811 | 1/1981 | Grenoble et al. | 208/122 |

Primary Examiner—Delbert E. Gantz
Assistant Examiner—O. Chaudhuri
Attorney, Agent, or Firm—Marthe L. Gibbons

[57] ABSTRACT

A catalyst regeneration process is provided in which the rate of removal of carbon from the coked catalyst is increased at a relatively low temperature when the catalyst comprises a perovskite. Hydrocarbon treating processes utilizing the regenerated perovskite-containing catalysts are also provided. The regenerated catalyst is particularly suited for use in catalytic cracking of hydrocarbon residua.

25 Claims, 1 Drawing Figure

U.S. Patent      May 1, 1984      4,446,011
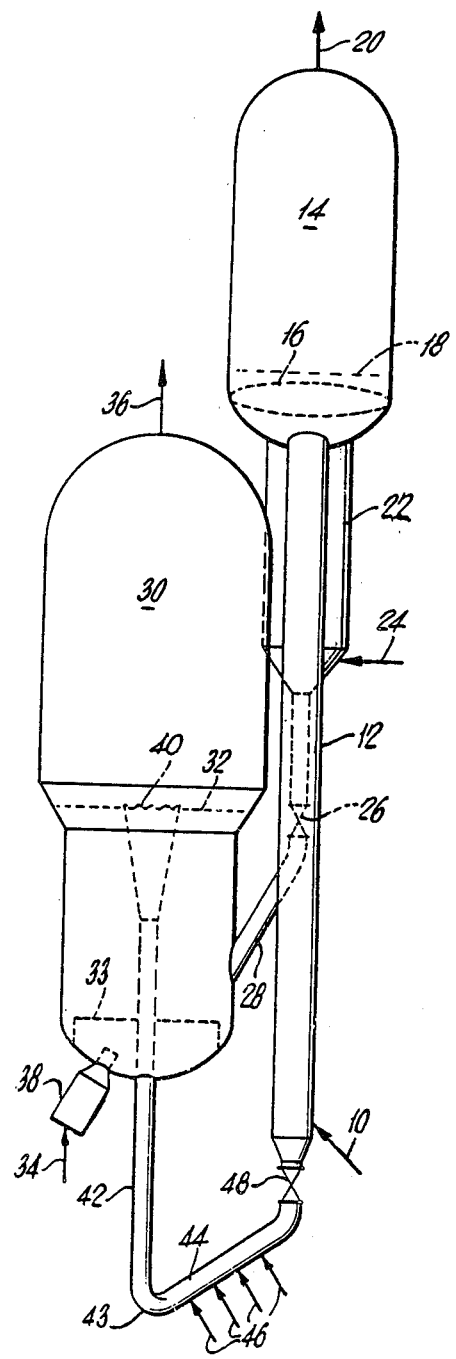

PROCESS FOR REGENERATING PEROVSKITE CATALYSTS AND HYDROCARBON TREATING PROCESSES UTILIZING THE REGENERATED CATALYST

BACKGROUND OF THE INVENTION

1. Field of the Invention

This invention relates to a process for the regeneration of perovskite-containing catalysts and use of the regenerated catalysts in hydrocarbon treating processes, particularly in hydrocarbon cracking processes.

2. Description of the Prior Art

The use of perovskite-containing catalysts for hydrocarbon treating processes is known. U.S. Pat. No. 4,208,269 and U.S. Pat. No. 4,179,409 disclose perovskite catalysts and their use in hydrocarbon conversion processes.

U.S. Pat. No. 4,055,513 and U.S. Pat. No. 4,102,777 disclose high surface area perovskite catalysts and their use in hydrocarbon conversion processes.

In various processes for the conversion of hydrocarbons in the presence of a catalyst, a hydrocarbonaceous material (coke) deposits on the catalyst thereby causing at least a partial deactivation of the catalyst. For example, in catalytic cracking processes, it is well known to withdraw the partially deactivated (coked) catalyst from the catalytic cracking zone and to regenerate the coked catalyst by combustion of the carbonaceous deposit at an elevated temperature at oxidizing conditions to form oxides of carbon and steam. The regenerated catalyst, which may still comprise a residual carbonaceous deposit which has not been completely removed, is then recycled to the catalytic cracking zone.

It is known to use high temperature regeneration to effect more complete removal of the carbonaceous deposit, that is, to obtain a catalyst having a residual coke level of less than 0.05 weight percent on catalyst from deactivated catalysts. See, for example, U.S. Pat. No. 3,909,392.

It has now been found that the rate of combustion of carbon on a coked catalyst can be increased at relatively low regeneration temperatures when the catalyst comprises a perovskite.

SUMMARY OF THE INVENTION

In accordance with the invention there is provided, a process for regenerating an at least partially deactivated catalyst having a carbonaceous deposit, said catalyst comprising a perovskite having at least one transition metal cation selected from the group consisting of elements having atomic numbers ranging from 21 through 30, from 39 through 48, from 57 through 80 and from 89 to 92, which comprises the steps of: (a) contacting said deactivated catalyst with an oxidizing agent at a temperature of at least about 751° F. (400° C.) for a time sufficient to remove at least a portion of said carbonaceous deposit from said catalyst, and (b) recovering the resulting regenerated catalyst.

Furthermore, in accordance with the invention there are also provided hydrocarbon treating processes utilizing the regenerated perovskite-containing catalyst.

The term "perovskite" is intended herein to designate metal oxides having the ideal and non-ideal perovskite-type crystalline structure. The ideal perovskite crystalline structure is defined by the empirical formula $ABO_3$ in which A and B are cations of at least two different metals and in which the A cation is coordinated to 12 oxygen atoms while the B cation occupies octahedral sites and is coordinated to 6 oxygen atoms. The ideal perovskite structure is cubic; however, few compounds have this ideal structure. A more complete description of the perovskite type structure can be found in *Structural Inorganic Chemistry*, A. F. Wells, 3rd Edition, Oxford, The Clarendon Press, 1962, pages 494–499. In general, the algebraic sum of the ionic charges of the two or more metal cations of the perovskite equals 6.

BRIEF DESCRIPTION OF THE DRAWING

The FIGURE is a schematic flow plan of one embodiment of the invention.

DETAILED DESCRIPTION OF THE INVENTION

The regeneration process of the invention is suitable for the regeneration of a catalyst that has become at least partially deactivated by the deposition of a carbonaceous material (coke) on the surface of the catalyst, such as occurs during use of catalysts in numerous hydrocarbon treating processes, for example, in catalytic cracking processes. The carbonaceous deposit on the catalyst may range from about 0.10 to about 25.0 weight percent of the catalyst, depending on the hydrocarbonaceous feed utilized in the treating process and operating conditions of the treating process. Suitable coked catalysts that may be regenerated by the regeneration process of the present invention are catalysts which comprise a perovskite having at least one transition metal cation. The term "transition metal" is intended herein to designate elements having atomic numbers ranging from 21 through 30, from 39 through 48, from 57 through 70, from 89 through 92 of the Periodic Table of Elements. Preferred transition metal cations include lanthanum, cobalt, cerium, hafnium, titanium, chromium, zirconium and mixtures thereof, such as for example, the perovskite, lanthanum cobaltite, $LaCoO_3$. The Periodic Table of Elements referred to herein is in accordance with the table in *Handbook of Chemistry and Physics* published by Chemical Rubber Company, Cleveland, Ohio, 46th Edition. Preferably, the perovskite additionally comprises an alkaline earth metal cation selected from the group consisting of beryllium, magnesium, calcium, strontium, barium and mixtures thereof. More preferably, the perovskites are barium zirconate and barium hafnate. Most preferably, the perovskite is barium zirconate. The perovskite may be a single perovskite or a mixture of perovskites. The perovskite may be present in the catalyst in an amount ranging from about 0.1 to 100 weight percent. Thus, the catalyst may be an unsupported perovskite, that is, 100% perovskite or the catalyst may be a composite catalyst comprising a perovskite. The composite catalyst may include crystalline metallosilicate zeolites, carbon monoxide oxidation promoters; supports such as silica, silica-alumina, silica-magnesia, silica-zirconia, other inorganic oxides, clay, acid-treated clays, etc. The perovskite component of the composite catalyst may be present in the form of separate perovskite particles that are used in physical admixture with the particles of other catalyst components or inert particles, or the perovskite may be present in a composite particle which comprises other components of the catalyst. The perovskite may also be used as support for other catalytic components. The at least partially deactivated, i.e. coked catalyst, is contacted with an oxidizing agent at a temperature sufficient to remove at least a portion of the carbonaceous material by combustion thereby forming oxides of carbon and steam and to regenerate the at least partially deactivated catalyst. Suitable regeneration temperatures include a temperature of at least about 751° F. (400° C.), preferably a temperature of at least about 850° F. (454.4° C.). The upper temperature limit is not critical and will depend in part upon the particular catalyst being regenerated. The temperature should not be so high as to impair the catalyst. A suitable temperature range includes from about 751° F. to about 1400° F. (760° C.). The oxidizing agent used is not critical and will generally be an oxygen-containing gas such as air, oxygen, and mixtures thereof. The pressure in the regeneration zone may range from atmospheric to superatmospheric, for example, from 0 to 150 psig, typically from 0 to 45 psig. The partially deactivated (coked) catalyst is contacted with an oxidizing agent for a time sufficient to remove by combustion at least a portion of the carbonaceous deposit and thereby regenerate the catalyst. The rate of combustion of carbon (coke) at a given temperature utilizing, for example, a barium zirconate perovskite catalyst of the present invention, can be calculated from the following general equation: combustion rate $= d(W/W_o)/dt = -k_o \exp(-E/RT)$ wherein $W_o$ = original weight of coke on the solid
$W$ = final weight of coke on the solid
$k_o$ = a constant
$\exp = 2.7183$
$E$ = energy of activation
$R$ = ideal gas constant
$T$ = absolute temperature The values for $k_o$ and $E$ in the combustion rate equation for coke deposited on a barium zirconate catalyst and for coke deposited on an inert alpha alumina solid are given in Table I.

TABLE I

| Solid | Solid Type | $k_o$ | E |
|---|---|---|---|
| Coked BaZrO$_3$ | Catalytic | $2.172 \times 10^{10}$ | 18,820 |
| Coked alpha alumina | Inert | $1.252 \times 10^{10}$ | 19,025 |

The ratio of combustion rates of coked BaZrO$_3$ relative to coked alpha alumina can be calculated utilizing the following equations:

$$\frac{\text{BaZrO}_3 \text{ rate}}{\text{alpha alumina rate}} = \frac{2.172 \times 10^{10} \exp(-18820/RT)}{1.252 \times 10^{10} \exp(-19025/RT)}$$

Table II shows the increased combustion rate of carbon (coke) in the presence of a perovskite catalyst of the present invention relative to the rate of combustion of carbon on an inert solid, such as alpha alumina.

TABLE II

| Temperature, °C. | Burning rate of coke on BaZrO$_3$ relative to coke on alpha alumina |
|---|---|
| 300 | 2.48 |
| 400 | 2.35 |
| 500 | 2.26 |
| 600 | 2.19 |
| 700 | 2.14 |
| 800 | 2.10 |

Furthermore, the regeneration process of the present invention is suitable for producing a catalyst having less than 0.01 weight percent residual carbon on catalyst.

The regeneration process of the present invention is particularly suitable to increase the conversion of carbon monoxide to carbon dioxide in the gaseous product of the regeneration. When it is desired to increase the conversion of CO to $CO_2$, it is preferred to utilize in the regeneration zone a physical mixture of particles of perovskite and particles of partially deactivated catalyst. When a physical mixture of perovskite and deactivated catalyst is used in the regeneration zone to enhance conversion of CO to $CO_2$, the perovskite is suitably present in an amount ranging from 0.1 to 20 weight percent, preferably from about 1 to 10 weight percent of the total catalyst to promote the oxidation of carbon monoxide to carbon dioxide in the gas produced by the regeneration of the catalyst.

The regenerated perovskite catalyst of the present invention is suitable for use in hydrocarbon treating processes such as catalytic cracking, catalytic fluid coking, including integrated fluid coking and coke gasification; reforming, hydrogenation, oxidation, dehydrogenation, isomerization, hydrocracking, hydrodesulfurization, denitrogenation, demetallization, etc.

The term "hydrocarbon treating" process, is used herein to designate a process in which the hydrocarbon product may have essentially the same boiling point as the feed or a process in which the hydrocarbon product may have a lower boiling point than the feed.

Suitable feeds for use in these processes are any of the conventional hydrocarbon feeds used in the desired process ranging from lower boiling hydrocarbons to naphtha through residual oils.

The regenerated perovskite catalyst is particularly suited for use in catalytic cracking and catalytic fluid coking, including in integrated fluid coking and gasification processes, using high boiling point hydrocarbonaceous feeds having a high content of metallic contaminants and a high Conradson carbon residue.

Suitable catalytic cracking conditions include a temperature ranging from about 750° to about 1300° F., a pressure ranging from about 0 to about 150 psig, typically from about 0 to about 45 psig. The catalytic cracking process may be carried out as a fixed bed, moving bed, ebullated bed, slurry, transferline (dispersed phase) or fluidized bed operation. Suitable catalyst to hydrocarbonaceous feed weight ratio in the catalytic cracking zone include from about 1:1 to about 20:1, preferably from about 1:1 to about 13:1 and more preferably from about 1:1 to about 7:1.

Suitable hydrocarbonaceous feeds for the catalytic cracking process of the present invention include naphtha, hydrocarbonaceous oils boiling in the range of about 430° to about 1050° F., such as gas oils; heavy hydrocarbonaceous oils comprising materials boiling above about 1050° F.; heavy and reduced petroleum crude oil, petroleum atmospheric distillation bottoms; petroleum vacuum distillate bottoms; pitch, asphalt, bitumen, other heavy hydrocarbon residues; tar sand oil; shale oil; liquid products derived from coal liquefaction processes and mixtures thereof. The process is particularly suited for heavy feeds having a Conradson carbon residue of at least 5 weight percent, generally from about 5 to about 50 weight percent, preferably above 7 weight percent (as to Conradson carbon residue, see ASTM Test D 189-65). All boiling points to which reference is made herein are atmospheric pressure boiling points unless otherwise specified.

DESCRIPTION OF THE PREFERRED EMBODIMENT

The preferred embodiment will be described with reference to the accompanying drawing.

Referring to the FIGURE, a suitable hydrocarbon feed is injected via line 10 into transferline riser 12 which contains hot regenerated catalyst. Upon injection, the hydrocarbon feed is vaporized by contact with the hot catalyst. The resulting suspension of vaporized hydrocarbon and catalyst flows upwardly through the straight vertically disposed transferline riser where at least a portion of the hydrocarbon feed is cracked to lower boiling products. The density of the catalyst in the suspension may range generally from about 0.7 to about 10 pounds per cubic foot, preferably, from about 1 to 45 pounds per cubic foot. The suspension passes through the transferline riser (reactor) at a velocity between about 8 and about 60 feet per second, preferably from about 15 to 35 feet per second. The pressure in the transferline riser may be between 10 and 40 psig, for example, about 35 psig. The cracking temperature in the transferline riser may be between 825° F. and 1200° F., with the temperature at the inlet being higher than at the outlet of the transferline riser. Suitable space velocity in the transferline riser may range from about 40 to about 200 weight of hydrocarbon feed per hour per weight part of catalyst, and the catalyst to oil weight ratio may be between 3 and 10. The length to diameter (L/D) of the transferline riser may be between 30 and 6. Desirably, the length to diameter ratio of the transferline riser is such as to provide three seconds of gas resistance when the gasiform suspension of catalyst flows through the transferline at an average velocity of about 30 feet per second. The contact time can be reduced by 1 to 2 seconds when an easily crackable feed, such as residuum, is processed. The transferline riser projects upwardly into the lower portion of a gas-solids separation vessel 14 and terminates beneath distributing grid 16. Vessel 14 is positioned at a spaced distance and adjacent to regeneration vessel 30. Desirably, at least a portion of it is also positioned at a higher level than the top of vessel 30. The riser enters into the bottom cone of vessel 14 directly under grid 16 which is welded directly to the vessel shell. Thus, there is no need for an expandable seal or joint between the internal wall of the vessel and the grid such as normally exists in a unit having a distributor grid.

The suspension passes into a dense bed of fluidized catalyst having a level indicated at 18 where further hydrocarbon conversion occurs. The cracked hydrocarbon vapors pass through the upper level of the dense fluidized bed into superimposed dilute phase and cyclone separators (not shown) disposed in the upper portion of vessel 14, to separate product vapors from entrained catalyst particles. The catalyst particles are returned to the dense bed via cyclone diplegs and the product vapors are removed via product outlet line 20. Desirably, the cyclone separator may be a two-stage cyclone system. When increased gasoline boiling range product is desired, the dense fluidized bed may be omitted in vessel 14 and the transferline may be extended into the vessel such that the main conversion of hydrocarbons may occur in the transferline. The transferline may terminate directly in one or more cyclones located near the top of the vessel. Additional cyclones may be used to separate the catalyst substantially completely. The lower portion of vessel 14 comprises a stripping zone 22 in which hydrocarbons which adhere to spent catalyst are removed by stripping with a stripping gas, such as steam introduced via line 24. Desirably, grid 16 is sloped to facilitate the flow of spent catalyst into stripping zone 22. The stripping zone is offset 180 degrees from the transferline entrance into vessel 14. The pressure balance of the unit will allow the catalyst level in the stripping zone to be held either somewhat above grid 16 to provide a higher hold-up operation or it can be held very low in the stripping zone so as to provide dilute phase stripping and no dense bed cracking. Spent stripped catalyst flows from the stripper via control valve 26 into conduit 28 which terminates in the lower portion of regeneration vessel 30. The spent catalyst forms a fluidized bed having a level indicated at 32 above supporting grid 33 in the regeneration vessel. An oxygen-containing gas (air) is introduced via line 34 into the regeneration vessel to fluidize the catalyst and to react with a carbonaceous deposit thereof. Flue gas formed by combustion of the carbonaceous deposit and entrained solids pass through a cyclone separator system (not shown) disposed in the regeneration vessel. Solids are returned via cyclone dipleg to the fluidized bed while flue gases are removed overhead via line 36. Suitable operating conditions for the regeneration vessel are: a temperature in the range of about 751° F. to about 1400° F., a pressure in the range of about 10 to about 45 psig, a superficial velocity of the gases passing upwardly through the regeneration vessel selected to maintain catalyst particles as a dense turbulent fluidized bed having a density between about 9 and 30 pounds per cubic foot.

The top of the regeneration vessel may be an enlarged section so as to provide sufficient space for adequately housing two or more stages of high efficiency cyclones. An auxiliary burner 38 is attached to the bottom of the regeneration vessel for heating the unit on startup of the process. The catalyst level within the regeneration vessel is held constant by an overflow well 40 located on the center line of the regeneration vessel. The well is the open upper end of downflow withdrawal standpipe 42 which extends into the regeneration vessel.

Standpipe 42 is connected at its lower end by means of angle bend 43 with a vertically inclined conduit 44, which in turn, connects with vertical transferline riser 12 which has a section projecting upwardly into vessel 14 as previously described. Aeration taps 46, in which a fluidizing gas, such as steam, may be injected, are provided along the vertically inclined conduit and riser 12. Desirably, the vertically inclined conduit is sloped at an angle of about 45 degrees. The vertically inclined conduit is made long enough so that it will clear the vertical projection of the enlarged section of the regeneration vessel and permit transferline riser to be vertical. If desired, a shut-off valve 48 may be provided at the entrance of the vertically inclined conduit into riser 12 or, alternatively, it may be installed at the bottom of standpipe 42 for use in startup of the unit or in emergency. This shut-off valve will always be either wide open or closed tight since it is not required for actual regulation of catalyst circulation when the unit is in operation. The shut-off valve may be located essentially anywhere along the length of riser 12 or anywhere along the length of standpipe 42. Instead of a shut-off valve, a ceramic-lined restriction orifice may be used.

By using the above described type of flow scheme, a control slide valve is not required in the hot regenerated catalyst circuit.

Catalyst flows down into standpipe 42 and assumes a density equal to approximately the minimum fluidization density of the catalyst or to somewhat less than 80 percent of this density as controlled by aeration gas to the standpipe. Pressure is built up as the catalyst flows down the standpipe. The maximum pressure exists at the angle bend entrance to the vertically inclined conduit. If the regeneration vessel pressure is 40 psig, the pressure at this point is about 46 psig. At this point, the catalyst stream, at approximately the same density, makes the bend and, by hydrostatic force, flows upward to the lower pressure vessel 14. The pressure in vessel 14 will be about 33 psig so that there is a large pressure driving force in this circuit. Catalyst flows upwardly in the vertically inclined conduit at essentially this same density. Aeration is added at aeration taps 46 to compensate for loss of aeration gas which is migrating directly vertically in the inclined conduit. This gas will preserve the fluidity of the catalyst in the bottom portion of the line, since the catalyst would deaerate and slump in the line if aeration were not provided. The aeration gas will flow in the direction of lower pressure in the unit which will be cocurrent with the catalyst flow to vessel 14. Alternatively, a quantity of gas greater than required just for aeration or fluidity control can be added to lower the density in the vertically inclined part of conduit 44. This will lower the catalyst density and increase catalyst flow. However, the addition of this gas is undesirable since relatively large quantities would be required to accomplish any significant density reduction. This would mean a requirement of a large amount of steam which would undesirably increase the size of the downstream equipment.

The feed is introduced at the top of the angle bend at location 10. The pressure at this point will be about 40 psig for a unit with a 40 psig regeneration vessel. Since there is a 46 psig pressure at the bottom of the standpipe for this illustrative embodiment, there is a 6 psig static pressure differential keeping feed from flowing in reverse to the regeneration vessel. This differential is provided by the vertical height of vertically inclined conduit 44.

The following examples are presented to illustrate the invention.

EXAMPLE 1

A 25.56 mg portion of particles of a catalyst comprising a barium zirconate perovskite having a carbonaceous deposit of 17.6 weight percent, herein designated "catalyst A", was heated in an inert atmosphere to 600° C. and then combusted in the presence of air at a temperature of about 600° C. for about 17 minutes. The weight changes were determined by thermogravimetric analysis. A 26.81 mg portion of particles of alpha alumina having a carbonaceous deposit of about 18.84 weight percent, herein designated "Solid B", was heated in an inert atmosphere to 600° C. and combusted in the presence of air at a temperature of about 600° C. under identical conditions for about 17 minutes. The fractional weight losses versus time for "catalyst A" and "Solid B" are shown in Table III.

TABLE III

| 1112° F. (600° C.) Coke Combustion Time (Min.) | Fraction of Coke Remaining During Coke Combustion | |
| --- | --- | --- |
| | Coke Combustion With Solid B | Coke Combustion With Catalyst A |
| 0 | 1.000 | 1.000 |
| 1 | 0.978 | 0.956 |
| 2 | 0.967 | 0.937 |
| 3 | 0.951 | 0.906 |
| 4 | 0.922 | 0.861 |
| 5 | 0.875 | 0.791 |
| 6 | 0.814 | 0.682 |
| 7 | 0.739 | 0.560 |
| 8 | 0.640 | 0.385 |
| 9 | 0.534 | 0.233 |
| 10 | 0.407 | 0.076 |
| 11 | 0.283 | 0.012 |
| 12 | 0.167 | 0.001 |
| 13 | 0.076 | 0.000 |
| 14 | 0.023 | 0.000 |
| 15 | 0.004 | 0.000 |
| 16 | 0.001 | 0.000 |
| 17 | 0.000 | 0.000 |

As can be seen from Table III, the fraction of coke remaining on Catalyst A, which is a catalyst in accordance with the present invention, was less in a shorter period of time than the fraction of coke remaining on solid B.

The rates of coke combustion for "Catalyst A" and for "Solid B" at 1112° F. are given in Table IV.

TABLE IV

| 1112° F. (600° C.) Coke Combustion: Rate of Coke Combustion Time (Min.) | Coke Combustion Rates (Min.$^{-1}$) | |
| --- | --- | --- |
| | Coke Combustion With Solid B | Coke Combustion With Catalyst A |
| 1 | 0.007 | 0.014 |
| 2 | 0.011 | 0.020 |
| 3 | 0.017 | 0.031 |
| 4 | 0.031 | 0.050 |
| 5 | 0.048 | 0.081 |
| 6 | 0.066 | 0.114 |
| 7 | 0.086 | 0.147 |
| 8 | 0.101 | 0.169 |
| 9 | 0.118 | 0.177 |
| 10 | 0.130 | 0.144 |
| 11 | 0.137 | 0.069 |
| 12 | 0.128 | 0.000 |
| 13 | 0.099 | — |
| 14 | 0.057 | — |
| 15 | 0.018 | — |
| 16 | 0.004 | — |
| 17 | 0.000 | — |

As can be seen from Table IV, the rate of coke combustion was greater when "Catalyst A" comprising a perovskite was utilized compared to coke combustion from an alpha alumina support which did not comprise a perovskite.

EXAMPLE 2

The rate of combustion of varying amounts of coke deposited on barium zirconate and coke deposited on alpha alumina was determined at various temperatures. The composition of the initial solids used are shown in Table V.

TABLE V

| Initial Solid | Alpha Alumina, wt. in mg | Barium Zirconate, wt. in mg | Coke, wt. in mg |
| --- | --- | --- | --- |
| C | 44.18 | — | 6.87 |
| D | 43.40 | — | 6.88 |
| E | 43.35 | — | 6.83 |

TABLE V-continued

| Initial Solid | Alpha Alumina, wt. in mg | Barium Zirconate, wt. in mg | Coke, wt. in mg |
|---|---|---|---|
| F | — | 41.11 | 7.84 |
| G | — | 42.29 | 7.92 |
| H | — | 43.20 | 8.21 |

The results are summarized in Tables VI and VII.

TABLE VI

| | | INERT SOLID + COKE, RATE OF COMBUSTION | | |
|---|---|---|---|---|
| Solid | Temperature °C. | Initial wt. of Solid + Coke, mg | Final weight of Solid + Coke, mg | Rate of coke Combustion, $\min^{-1}$ |
| C | 400 | 51.05 | 44.18 | 0.00663 |
| D | 425 | 50.28 | 43.40 | 0.01833 |
| E | 450 | 50.18 | 43.35 | 0.04650 |

TABLE VII

| | | CATALYTIC SOLID + COKE, RATE OF COMBUSTION | | |
|---|---|---|---|---|
| Solid | Temperature °C. | Initial wt. of Catalyst + Coke, mg | Final weight of Catalyst + Coke, mg | Rate of coke Combustion, $\min^{-1}$ |
| F | 375 | 48.95 | 41.11 | 0.00490 |
| G | 400 | 50.21 | 42.29 | 0.01450 |
| H | 425 | 51.41 | 43.20 | 0.04790 |

A comparison of the combustion rate for the inert solid (e.g. alpha alumina) versus the catalytic solid (e.g. barium zirconate) is given in Table VIII.

TABLE VIII

| Combustion Rate Comparison Wherein Combustion Rate = $d(W/W_o)/dt = -k_o \exp(-E/RT)$ | | |
|---|---|---|
| Solid | $k_o$ | E |
| Alpha alumina | $1.252 \times 10^{10}$ | 19025 |
| Barium zirconate | $2.172 \times 10^{10}$ | 18820 |

As can be seen from the data in the above tables, Catalysts A, F, G and H, which are perovskite catalysts of the present invention, increased the rate of combustion of coke (i.e. carbon) relative to the rate of combustion of coke deposited on an inert solid.

EXAMPLE 3

A deactivated (spent) conventional cracking catalyst, herein designated "Catalyst I", had a carbonaceous deposit (carbon) of approximately 0.85 weight percent. The initial (fresh), uncoked, catalyst was a commercially available cracking catalyst comprising about 16 weight percent rare earth exchanged faujasite dispersed in a matrix of silica-alumina gel and kaolin. The rare earth metal oxide content of the fresh catalyst was about 2.9 weight percent, calculated as rare earth metal oxides based on the total catalyst "Catalyst I" was placed in a quartz tube and burned at 600° C. in air to regenerate the catalyst. Total carbon (coke) on "Catalyst I" charged to the tube was 10.0 grams. The resulting gas was recovered in a bag and analyzed by mass spectrometry to determine the amounts of CO and $CO_2$ (Run No. 1). A duplicate run (Run No. 2) was made using 10 grams of "Catalyst I", and 1 gram of a barium zirconate perovskite. The results of the gas analyses from these runs are summarized in Table IX.

TABLE IX

| Run No. | $CO_2/CO$ (mole/mole) |
|---|---|
| 1 | 1.83 |
| 2 | 3.04 |

Run No. 2 was a run in accordance with the present invention.

EXAMPLE 4

Experiments similar to those described in Example 3 were made at 700° C. utilizing (a) "Catalyst I", (Run No. 3); (b) "Catalyst I" plus 1 gram of $BaTiO_3$ perovskite (Run No. 4) and (c) "Catalyst I" plus 1 gram of $LaCoO_3$ perovskite (Run No. 5). Results of the gas analyses resulting from these runs are summarized in Table X.

TABLE X

| Run No. | $CO_2/CO$ (mole/mole) |
|---|---|
| 3 | 1.66 |
| 4 | 2.09 |
| 5 | 9.58 |

As can be seen from Table X, Runs 3 and 5, which were runs in accordance with the present invention gave an increased $CO_2$ to CO ratio.

What is claimed is:

1. A process for regenerating an at least partially deactivated composite catalyst having a carbonaceous deposit at an increased rate of combustion of said carbonaceous deposit, said composite catalyst comprising a perovskite having at least one transition metal cation selected from the group consisting of elements having atomic numbers ranging from 21 through 30, from 39 through 48, from 57 through 80 and from 89 through 92, and at least one other catalytic component, which comprises the steps of:
    (a) contacting said deactivated composite catalyst with an oxidizing agent at a temperature of at least about 751° F. (400° C.) for a time sufficient to remove at least a portion of said carbonaceous deposit from said composite catalyst, and
    (b) recovering the resulting regenerated composite catalyst.

2. The regeneration process of claim 1 wherein said regeneration is conducted at a temperature ranging from about 751° F. (400° C.) to about 1400° F. (760° F.).

3. The regeneration process of claim 1 wherein said regeneration is conducted at a temperature of at least about 850° F. (454.4° C.).

4. The regeneration process of claim 1 wherein said oxidizing agent is an oxygen-containing gas selected from the group consisting of air, oxygen and mixtures thereof.

5. The regeneration process of claim 1 wherein said carbonaceous deposit on said deactivated catalyst is present in an amount ranging from about 0.10 to about 25 weight percent, based on the weight of the total catalyst.

6. The regeneration process of claim 1 wherein said regenerated catalyst comprises less than about 0.01 weight percent of the carbonaceous deposit.

7. The regeneration process of claim 1 wherein said transition metal cation is selected from the group consisting of lanthanum, cobalt, cerium, hafnium, titanium, chromium, zirconium and mixtures thereof.

8. The regeneration process of claim 1 wherein said perovskite additionally comprises an alkaline earth metal cation selected from the group consisting of beryllium, magnesium, calcium, strontium, barium and mixtures thereof.

9. The regeneration process of claim 1 wherein said perovskite is selected from the group consisting of barium zirconate, barium hafnate and mixtures thereof.

10. The regeneration process of claim 1 wherein said perovskite is present in said catalyst in an amount ranging from about 0.1 to 20 weight percent.

11. The regeneration process of claim 1 wherein said perovskite is present in said catalyst as a physical mixture of separate perovskite particles.

12. In a hydrocarbon treating process which comprises: contacting a hydrocarbonaceous feed, at hydrocarbon treating conditions with a composite catalyst that has been regenerated, the improvement which comprises: said composite catalyst having been regenerated at an increased rate of combustion by a process which comprises: contacting an at least partially deactivated composite catalyst comprising a perovskite having at least one transition metal selected from the group consisting of elements having atomic numbers ranging from 21 through 30, from 39 through 48, from 57 through 80, and from 89 through 92, and at least one other catalytic component, said composite catalyst having a carbonaceous deposit, with an oxidizing agent at a temperature of at least about 751° F. (400° C.) for a time sufficient to remove at least a portion of said carbonaceous deposit from said composite catalyst and to produce a regenerated composite catalyst.

13. The process of claim 12 wherein said regeneration is conducted at a temperature ranging from about 751° F. (400° C.) to about 1400° F. (760° C.).

14. The process of claim 12 wherein said oxidizing agent is an oxygen-containing gas selected from the group consisting of air, oxygen and mixtures thereof.

15. The process of claim 12 wherein said regenerated catalyst comprises less than about 0.01 weight percent of said carbonaceous deposit.

16. The process of claim 12 wherein said transition metal cation is selected from the group consisting of lanthanum, cobalt, cerium, hafnium, titanium, chromium, zirconium and mixtures thereof.

17. The process of claim 12 wherein said perovskite additionally comprises an alkaline earth metal cation selected from the group consisting of beryllium, magnesium, calcium, strontium, barium and mixtures thereof.

18. The process of claim 12 wherein said perovskite is selected from the group consisting of barium zirconate, barium hafnate and mixtures thereof.

19. The process of claim 12 wherein said perovskite is present in said catalyst in an amount ranging from about 0.1 to 20 weight percent.

20. The process of claim 12 wherein said hydrocarbon treating process is a catalytic cracking process.

21. The process of claim 20 wherein said catalytic cracking process is conducted at a temperature ranging from about 750° F. to about 1300° F.

22. The process of claim 20 wherein the catalyst to hydrocarbonaceous feed weight ratio ranges from about 1:1 to about 20:1.

23. The process of claim 12 or of claim 20 wherein said hydrocarbonaceous feed has a Conradson carbon content of at least about 5 weight percent.

24. The process of claim 12 wherein said perovskite is present in said catalyst as a physical mixture of separate perovskite particles.

25. A process for regenerating an at least partially deactivated catalyst having a carbonaceous deposit, which comprises the steps of:
 (a) contacting a physical mixture of particles of a perovskite and particles of a partially deactivated catalyst, said perovskite having at least one transition metal cation selected from the group consisting of elements having atomic numbers ranging from 21 through 30, from 39 through 48, from 57 to 80 and from 89 through 92, with an oxidizing agent at a temperature of at least about 751° F. (400° C.) for a time sufficient to remove at least a portion of said carbonaceous deposit from said catalyst, and
 (b) recovering the resulting regenerated catalyst.

* * * * *